United States Patent [19]

Heidorn

[11] Patent Number: 5,002,307
[45] Date of Patent: Mar. 26, 1991

[54] VEHICLE AIR BAG SAFETY SYSTEM

[75] Inventor: Michael E. Heidorn, Royal Oak, Mich.

[73] Assignee: Sheller-Globe Corporation, Detroit, Mich.

[21] Appl. No.: 379,212

[22] Filed: Jul. 13, 1989

[51] Int. Cl.⁵ .............................................. B60R 21/16
[52] U.S. Cl. .................................... 280/731; 280/743; 220/266; 264/259; 264/328.6; 264/DIG. 77
[58] Field of Search ............... 280/728, 731, 732, 743, 280/748, 751, 752; 220/266; 264/259, 328.6, DIG. 77

[56] References Cited

U.S. PATENT DOCUMENTS

| | | | |
|---|---|---|---|
| 3,819,205 | 6/1974 | Dunford et al. | 280/740 |
| 3,837,669 | 9/1974 | Nagazumi et al. | 280/733 |
| 3,853,334 | 12/1974 | Auman et al. | 280/728 |
| 3,887,215 | 6/1975 | Albrecht et al. | 280/730 |
| 3,907,330 | 9/1975 | Kondo et al. | 280/731 |
| 3,982,774 | 9/1976 | Ivashuk et al. | 280/737 |
| 4,010,235 | 3/1977 | Yardley et al. | 264/259 |
| 4,120,516 | 10/1978 | Takamatsu et al. | 280/728 |
| 4,148,503 | 4/1979 | Shiratori et al. | 280/731 |
| 4,148,503 | 4/1979 | Shiratori et al. | 280/731 |
| 4,246,213 | 1/1981 | Takamatsu et al. | 280/728 |
| 4,325,568 | 4/1982 | Clark et al. | 280/731 |
| 4,334,699 | 6/1982 | Patzelt et al. | 280/731 |
| 4,667,958 | 5/1987 | Raitto | 264/259 |

Primary Examiner—Charles A. Marmor
Assistant Examiner—Tamara L. Finlay
Attorney, Agent, or Firm—Dinnin & Dunn

[57] ABSTRACT

A cover member for an air bag installation, includes a shaped cap-link member of soft urethane molded directly onto and in covering relation to a pair of thermoplastic, L-shaped, angle members, the urethane adhering to the thermoplastic and operating to prevent inadvertent release of the urethane during deployment of the bag.

24 Claims, 4 Drawing Sheets

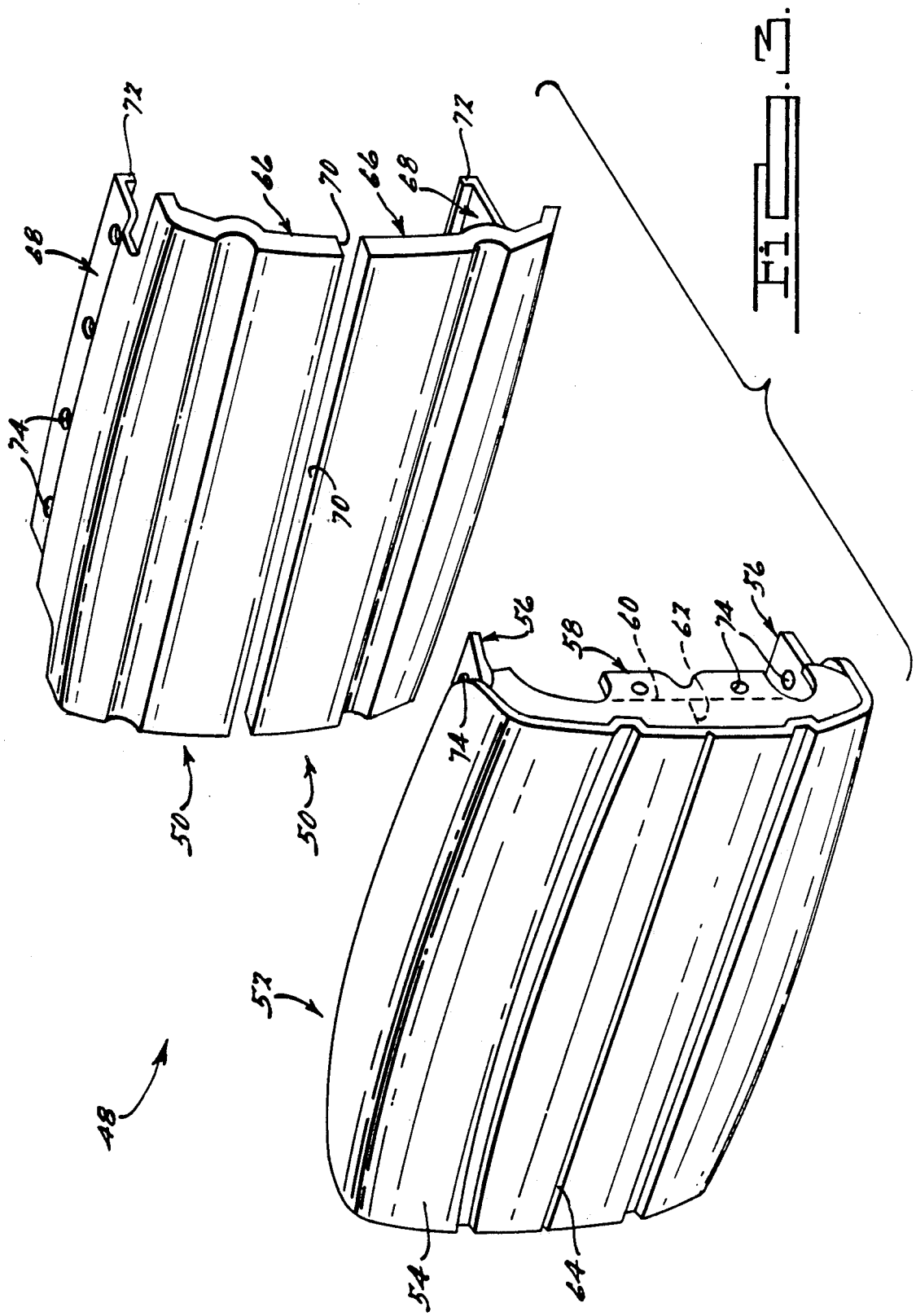

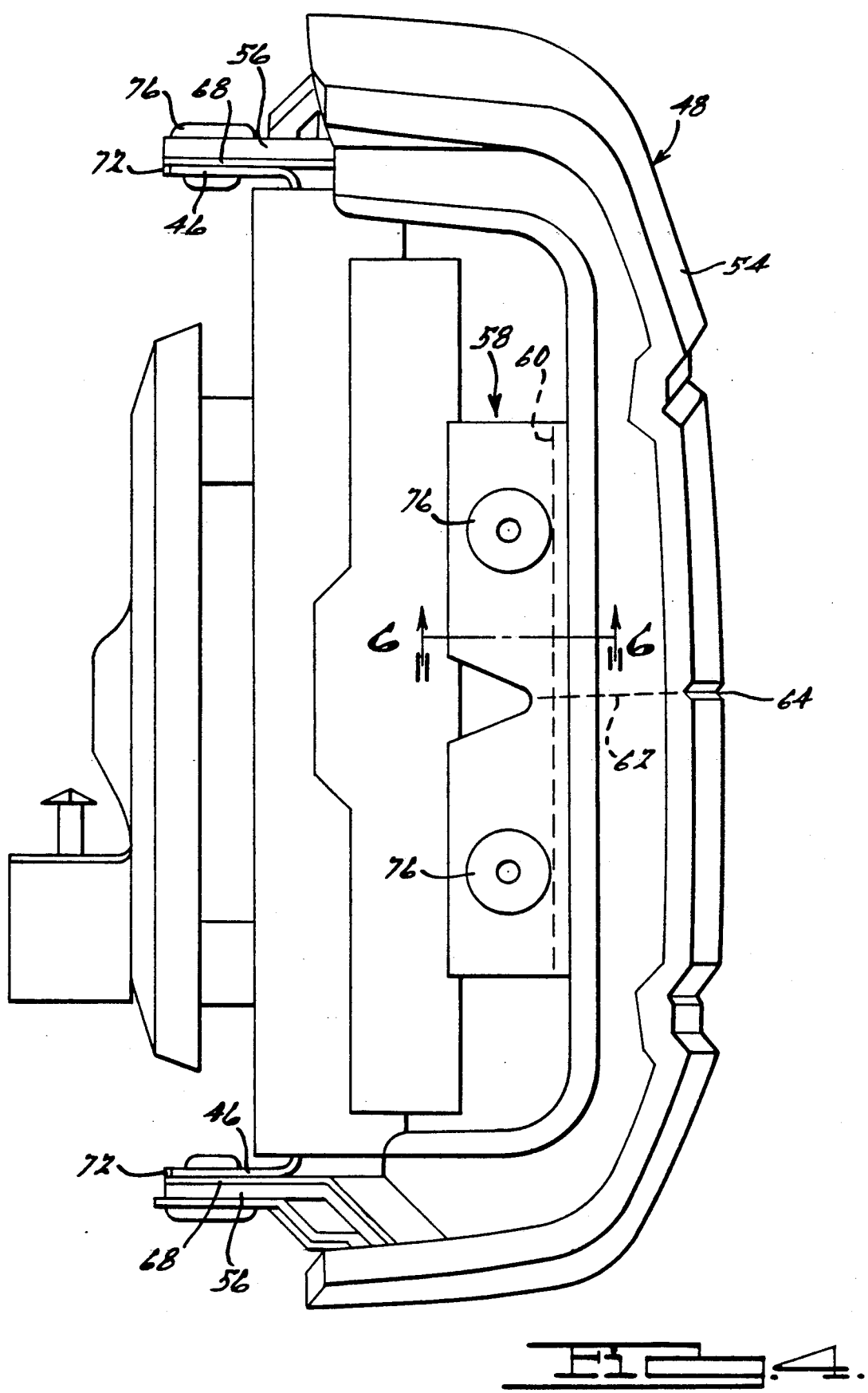

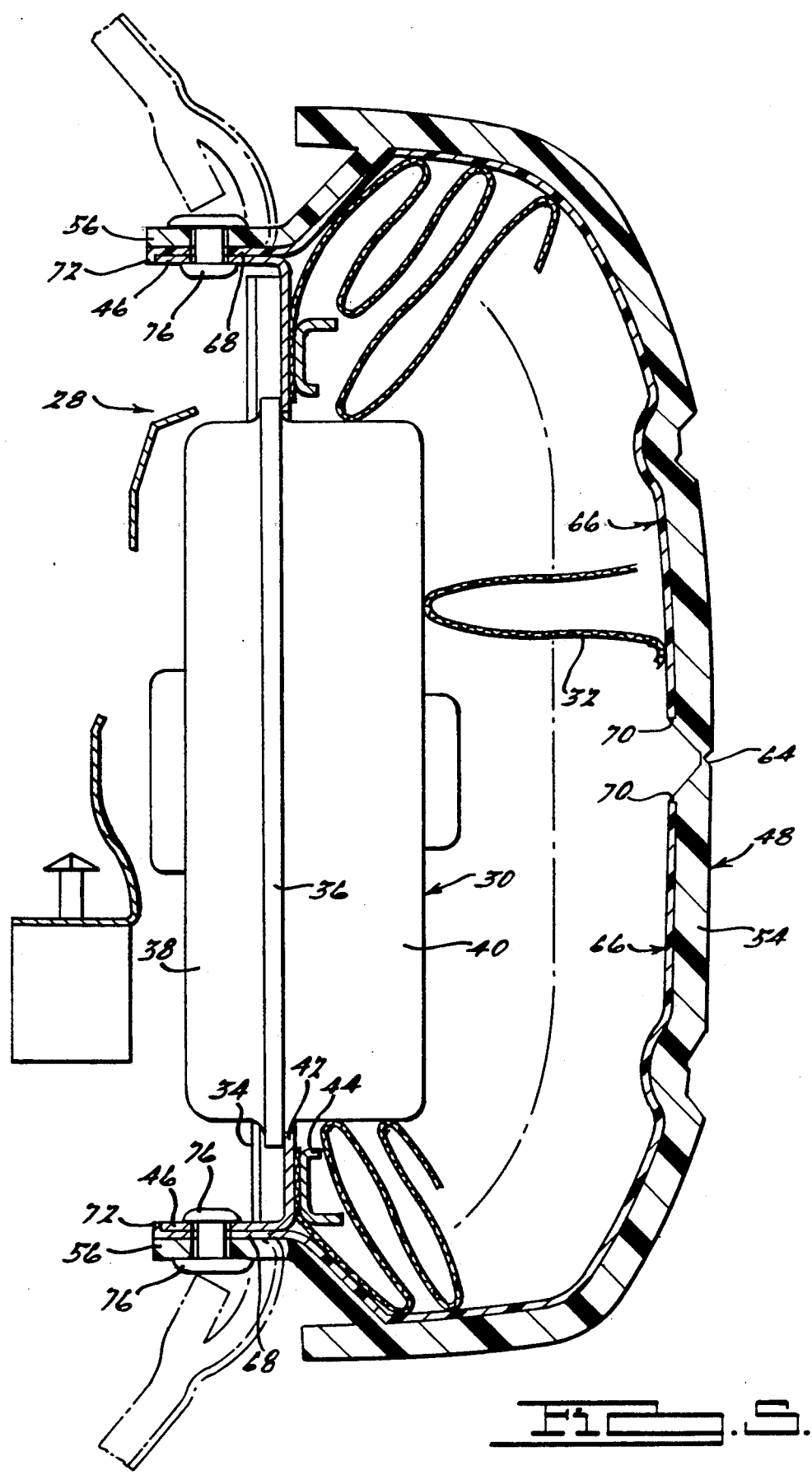

VEHICLE AIR BAG SAFETY SYSTEM

BACKGROUND OF THE INVENTION

This invention broadly relates to an improved vehicle air bag safety system. More particularly this invention relates to a unique cover mechanism adapted to open in a predetermined manner when the air bag itself is deployed.

The state of the art is indicated by the following references cited:

| Patent No. | Issue Date | Inventor(s) |
|---|---|---|
| 3,819,205 | June 25, 1974 | Dunford et al. |
| 3,837,669 | September 24, 1974 | Nagazumi et al |
| 3,853,334 | December 10, 1974 | Auman et al. |
| 3,887,215 | June 3, 1975 | Albrecht et al. |
| 3,907,330 | September 23, 1975 | Kondo et al. |
| 3,982,774 | September 28, 1976 | Ivashuk et al. |
| 4,148,503 | April 10, 1979 | Shiratori et al. |
| 4,325,568 | April 20, 1982 | Clark et al. |
| 4,334,699 | June 15, 1982 | Patzelt et al. |

There are already known steering wheels for motor vehicles that are provided with air bag cushions designed to convert from a folded inoperative position into an inflated operative position in order to cushion the vehicle operator in the event of a collision. The air cushion in its folded condition is connected through its bottom edge to a gas generator mechanism equipped with a diffuser section and attached to the steering wheel hub. The cushion is located in a recess in the central portion of the steering wheel and is held in position by a cover member. It has also been known in the past that an air bag installation may be used, for a conventional left-hand drive vehicle, wherein the vehicle occupant sitting in the right front seating position may be protected by an air bag that is deployable from a housing in the dashboard or instrument panel generally in front of the right-front seating position.

In the past, cover members have been used on air bag installations, wherein the cover member was made of an outer layer which was formed of a molded plastic (e.g. urethane) with a fibrous reinforcing mat placed within the plastic layer. This latter type of construction, which has been used commercially for the past several years, has had certain problems associated therewith. For example, it was difficult to manufacture such an air bag cover construction because, in the molding operation itself, it was very troublesome to place the fibrous reinforcing mat within the plastic material at or shortly before the time of molding. Secondly, the fibrous reinforcing fabric itself had to be sewn from small separate pieces and that was difficult, time consuming, and very expensive to do. Third, the fibrous fabric reinforcing material was very porous, and due to that high porosity it resulted in large amounts of entrapped air being left in the molded cover member; and then when the fabric was placed in the mold for molding the urethane material over it, the pressure of the incoming urethane would cause the air to be released; and, this would cause air voids on the surface of the plastic cover member which led to numerous rejects of the cover members being manufactured. Fourth, the fibrous fabric reinforcing material, being flexible, would sometimes tend to float within the mold as the molding operation was being carried out; and, this would result in the fabric more or less floating to the surface of the cover member causing blemishes on the decorative surfaces of the outer cover member, for example, on the decorative surface of the hub area of a steering wheel. Fifth, the fibrous fabric reinforcing material offered no structural support for the urethane make-up of the cover member; and, when the urethane was molded over the fibrous fabric reinforcing material there often later occurred some shrinkage in the urethane, and this caused a distortion in the outside shape of the finished urethane part.

Accordingly it is an object of this invention to provide a new and improved air bag product for motor vehicles.

Another object of the present invention is to provide a new air bag safety system for motor vehicles wherein the air bag installation is hidden from view by a unique air bag module cover.

Another object of the present invention is to provide a new air bag safety system wherein the module which makes up the air bag installation is covered by a new and unique plastic cover member which rips open in a safe and reliable manner when the air bag is deployed.

Another object of the present invention is to provide a new air bag safety system wherein the module which makes up the air bag installation is covered by a new and unique plastic cover member which rips open in a safe and reliable manner when the air bag is deployed.

Another object of the present invention is to provide a new air bag safety system for motor vehicles wherein the module which makes up the safety system is covered by a special air bag modular cover product.

Another object of the present invention is to provide a new air bag cover which is comprised of a thermoplastic molded inner-reinforcement layer and a second layer of a soft polyurethane foam material formed by a reaction injection molding process directly onto and in covering relation with the inner reinforcement layer, the center area of the air bag cover having a gap in the inner reinforcement layer; and the cross-section of the urethane at the gap being of reduced cross-section and thus relatively thin whereby to thus form a tear seam in the cover.

Still another object of the present invention is to provide a new and unique air bag cover wherein the cover member contains a thermoplastic reinforcement layer, to which the urethane is strongly adherent, which prevents inadvertent release of the urethane portion of the cover when the air bag is deployed.

SUMMARY OF THE INVENTION

Briefly stated, the present invention is a vehicle air bag safety system which includes a cover member for covering an air bag module installation, disposed inside a steering wheel or the like, on a motor vehicle. It is to be understood that the cover could be used to cover an air bag installation mounted on the vehicle dashboard and thus protect a passenger.

The cover member comprises an inner liner means molded of a durable thermoplastic and an outer cap-like member molded of a urethane which is strongly adherent to the liner means, the cover member being adapted to rip open along predetermined tearing lines so as to open along hinges when an air bag of the air bag installation is deployed. In a preferred embodiment the liner means comprises a pair of L-shaped angle members each including inwardly turned edges adapted to be fastened to a base member of the steering wheel or the like, the thermoplastic angle members being formed by injection molding and operative to prevent inadvertent release of the urethane layer due to the adherence of the urethane to the thermoplastic.

Advantageously, an air bag product in accordance with this invention defines a cover having tearing lines and living hinges which allow the top lid portion thereof to fold openly and the air bag to deploy rapidly The adherent nature of the polyurethane and its covering attachment to the thermoplastic inner liner obviates cover portions from scattering and flying into the face of the occupant.

Other objects, features and advantages of the present invention will become apparent from the subsequent description and the appended claims taken in conjunction with the accompanying drawings.

BRIEF DESCRIPTION OF THE DRAWINGS

FIG. 3 is an exploded perspective view of the cover member.

FIG. 4 is an end view of the cover taken along line IV—IV of FIG. 2.

FIG. 5 is a section view taken through the cover along line V—V of FIG. 2; and

DETAILED DESCRIPTION OF THE PREFERRED EMBODIMENT

Figure 1:
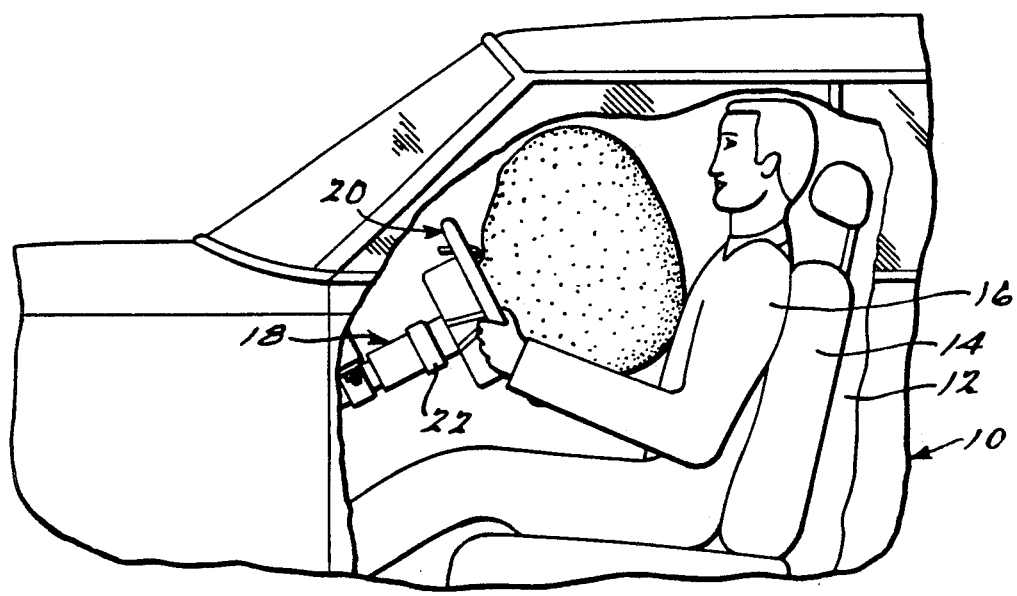
FIG. 1 is an elevation view of an automotive vehicle air bag safety system embodying the principles of the present invention in combination with the vehicle steering column assembly, the air bag being shown when in its expanded condition relative to the occupant.
Figure 2:
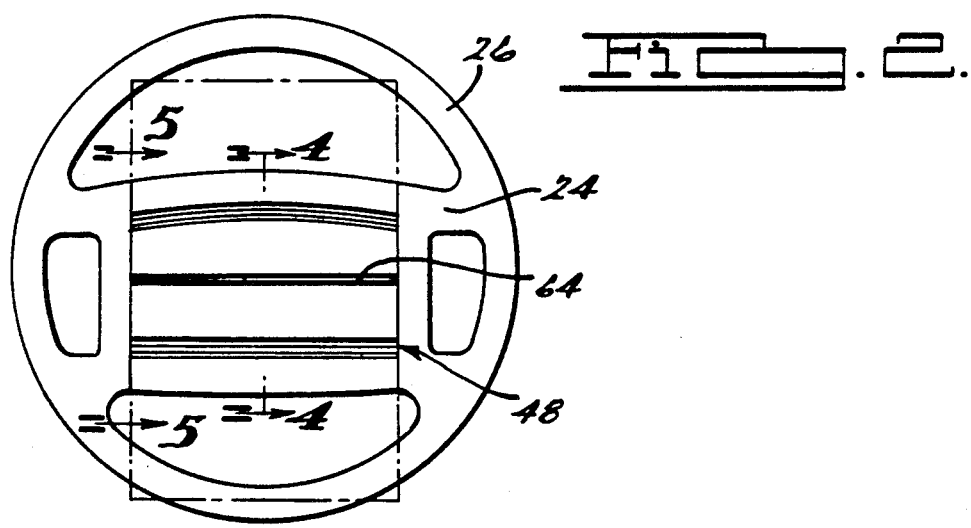
FIG. 2 is a plan view of the steering wheel with the air bag installation shown covered over by a cover member, in accordance with the present invention, the phantom lines indicating the condition of the cover when the air bag is deployed.
Figure 6:
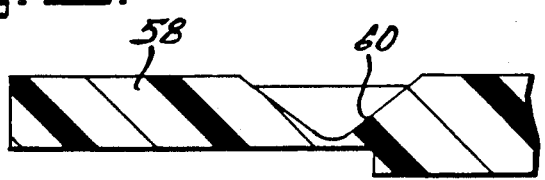
FIG. 6 is a section view of an endwall of taken through the cover along line VI—VI of FIG. 5.

Referring now to the drawings wherein like reference numerals are used throughout the various views to designate like parts, an automotive vehicle designated generally 10 includes an occupant compartment 12 having a conventional front seat 14 for supporting a driver 16 in a seated attitude. A steering column assembly 18 of the energy absorbing type is conventionally mounted on the vehicle and mounts a steering wheel 20 at its rearward or upper end for use by the driver. The steering column assembly 18 comprises a center hub 22 and spokes 24 extending radially from the hub to the wheel rim 26.

An inflatable air bag assembly 28 is mounted to the hub and within a cavity therein. An inflator or gas generator 30 and an air bag 32 are arranged at the central portion of the steering wheel hub defined by a bracket 34. The gas generator 30 has an annular shoulder 36, a lower body portion 38 received in an opening formed in the central portion of the bracket, and an upper body portion 40 received in a central opening of a mounting flange 42, the flange 42 operating to captivate the shoulder 36. The gas bag 32 is secured to the central portion of the mounting flange 42 by an annular retainer 44. When mounted the gas bag is arranged to surround the gas generator 30 and is received within the cavity in a foldup state.

In accordance with this invention, a cover member 48 for covering the air bag module installation is secured to a downwardly extending flange 46 of bracket 42, the cover being adapted to rip open along predetermined tearing lines so as to open along hinges when the air bag is deployed. The cover member includes a pair of elongated, L-shaped angle members 50, molded of a durable thermoplastic, and a cap-like member 52, molded of a soft elastic material, such as a urethane, which is strongly adherent to the thermoplastic The angle members form an inner liner which is operative to prevent inadvertent release of the urethane due to the adherence of the urethane to the thermoplastic and define a retention which prevents the composite cover from being subjected to unwanted deformation when the air bag is deployed.

The cap-like member 52 is generally rectangular in shape defining a lid portion 54, a pair of sidewalls 56, and a pair of endwalls 58, each of the walls extending downwardly from the lid, the endwalls extending between the sidewalls, and the ends of the respective sidewalls being integrally formed with the adjoining endwalls. The lid and walls are of reduced thickness in predetermined areas whereby to define predetermined frangible tearing lines. As shown, the tearing lines are orthogonal and define an "I", including a first and second tearing line 60 and 62 in each endwall, and a tearing line 64 extending across the lid portion. The outer cap-like member 52 is formed of a generally soft elastomeric material, and in accordance with this invention, a polyurethane. A suitable polyurethane is exemplified by Elastofoam I-3060U (trade name of BASF, produced in the U.S.).

The angle members 50 are symmetrically disposed so as to be in facing relation with one another, each angle member having a first leg 66 connected to the inner surface of the lid portion and a second leg 68 connected to the inner surface of its respective sidewall, the angle members in the embodiment shown extending the length of the sidewall and between the opposed endwalls. The angle members are positioned such that each has an edge 70 positioned adjacent to and extends parallel along the tear line 64 across the lid to enhance the lid portion opening, the first legs 66 and the urethane thereon defining "flaps" which permit the opening and deployment of the air bag in the manner shown in FIG. 1.

To further assure that the urethane and thermoplastic are secured together and remain so during deployment, the angle members can be provided with an array of openings (not shown) which fill with the elastomer during molding of the lid whereby to form gripping protuberances. To inhibit upward vertical movement of the cover, inwardly turned lips or flanges 72 can be formed on the angle members, which lips can be clipped below and seated in engaging relation along the bracket.

The thermoplastic angle members can be comprised of a relatively durable elastomer, including Hytrel 4774 or 5556 (trade name of Dupont, produced in U.S.). Each is desirable because it does not become brittle and functions at the lowest temperatures a vehicle will be expected to survive, that is −40 degrees F. The thermoplastic materials desirably have a flex modulus which, at low temperatures, such as −40 degrees F., are in the range between 110,000 psi (i.e., somewhat soft and easy to bend) and 130,000 psi (i.e., somewhat stiff and resistant to bending). Preferably, the flex modulus would be about 120,000 psi at −40 degrees F. In less severe temperatures, Pellathane 2103-80A (trade name of Dow, produced in the U.S.) may be sufficient.

The cover member is adapted to be secured to the steering wheel by means of aligned openings 74 in the sidewalls and endwalls and in the second legs of the brackets receiving a fastener, such as a rivet 76. Upon deployment of the air bag, the endwalls tear along lines 60 and 62 leaving the secured lower half of the endwalls secured to the bracket.

In application, a suitable molding core and cavity pair would be provided whereby the thermoplastic angle members would be formed by injection molding. Thereafter the premolded thermoplastic angle members 50 would remain positioned in place, relative to a second mold, placed thereabout. The urethane would be reaction injection molded directly about the nonsupported (i.e., outwardly facing) surfaces of the legs whereby the urethane forms an inner surface which adheringly "sticks" to the thermoplastic.

While the above description constitutes the preferred embodiment of the invention, it will be appreciated that the invention is susceptible to modification, variation, and change without departing from the proper scope or fair meaning of the accompanying claims.

I claim:

1. In a vehicle air bag safety system comprising a cover for covering an air bag module installation, the cover being comprising of an outer cap formed of elastic material and liner means for preventing the cover from being subjected to deformation when the air bag is deployed, said cover being characterized in that the liner means is interiorly of said cap and pre-molded of a durable thermoplastic to include a pair of elongated faces which are confronting and define an elongated thermoplastic to include a pair of elongated faces which are confronting and define an elongated separation, and the outer cap is molded of a urethane which is strongly adherent to the thermoplastic, said cap being formed by injection molding said urethane directly onto the thermoplastic liner means, said cap including a portion of reduced thickness adjacent said separation to form a tearing line and adapted to rip open along said tearing line so as to open when the air bag is deployed, and said liner means being operative to prevent inadvertent release of the urethane due to the adherence of the urethane to the thermoplastic and, wherein said thermoplastic liner means has a flex modulus of about 110,000 to about 130,000 psi at −40 degrees F.

2. The invention as recited in claim 1 wherein said cap is provided with an opposed pair of sidewalls and an opposed pair of endwalls, said walls being adapted to be fastened to said installation.

3. The invention as recited in claim 1 wherein said liner means comprises a pair of L-shaped angle members.

4. The invention of claim 1 wherein each said angle member includes a pair of legs and said cap defines a lid which adheres to one leg of each said angle member.

5. The invention as recited in claim 4 wherein said cap includes a pair of opposed sidewalls, each sidewall extending from said lid and adhered to the other leg of a respective angle member.

6. The invention as recited in claim 5 wherein each said other leg includes an inturned flange to engage the installation.

7. The invention as recited in claim 1 wherein said thermoplastic liner means has a flex modulus of about 120,000 psi at −40 degrees F.

8. In a vehicle air bag safety system, the improvement comprising, a cover member for covering an air bag module installation, disposed in the passenger compartment of a motor vehicle, characterized in that the cover member is comprised of a liner molded of a durable thermoplastic and including inwardly bent edges adapted to be fastened to the air bag module installation, a molded urethane outer layer which is strongly adherent to the liner, and frangible means associated with said outer layer and defining predetermined orthogonal tearing lines for enabling the cover member to rip open along hinges when an air bag of the air bag module installation is deployed, said urethane outer layer being injection molded directly onto said thermoplastic liner and prevented from inadvertent release due to the adherence of the urethane to the thermoplastic, and said thermoplastic liner having a flex modulus in the range of about 110,000 psi to 130,000 psi at −40° F.

9. The invention of claim 8 wherein said tearing lines define an "I" and divide the cover into a pair of flaps which rip open about the tearing lines.

10. The invention of claim 8 wherein said liner comprises a pair of longitudinally elongated, L-shaped, angle members, each angle member including first and second legs having, respectively, first and second ends with the first legs each having an elongated edge, said edges being arranged so as to face one another and extend generally parallel to one said tearing line, and the respective first and second ends of each said angle member being adjacent one and the other of the opposite endwalls of the cover.

11. In a vehicle of the type including a steering column, a module which has an air bag adapted to be deployed to protect an occupant, and a cover member for covering the module, the improvement characterized in that said cover member is comprised of a durable molded thermoplastic inner liner, a molded urethane outer layer that substantially covers an upper surface of the inner liner and is adapted to rip open along predetermined tearing lines so as to open along hinges when the air bag of the air bag installation is deployed, securing means for securing the outer layer into covering relation with the inner liner, and fastening means for fastening the cover member to a base member of the module, said thermoplastic liner means being operative to prevent inadvertent release of the urethane layer when the air bag is deployed due to the adherence of the urethane to the thermoplastic; and wherein, said thermoplastic liner has a flex modulus of about 120,000 psi at −40° F.

12. The invention of claim 11 wherein said fastening means comprises said liner including flange means for engaging the module.

13. The invention of claim 11 wherein said securing means comprises a plurality of raised gripping protuberances extending from one said liner and urethane layer and operating to interlock with the other of said inner liner and urethane layer.

14. An inflating-type occupant restraint device for a vehicle comprising a cover for a gas bag folded up and encased so as to inflate only when a gas generator operates, said cover member being molded of an elastic material and comprising a lid formed with a pair of opposing sidewalls that are securable to a fixed part of the vehicle and reduced wall thickness portions which define tearing lines which allow the lid to rip open when an air bag of the installation is deployed, and retention means for preventing the cover from being subjected to deformation when the air bag is deployed, characterized in that said retention means comprises a pair of L-shaped angle members premolded of a durable thermoplastic and having, respectively, first and second legs, and said elastic material is a urethane which is strongly adherent to the thermoplastic, and injection molded directly into covering relation onto the angle members, the angle members operating to prevent inadvertent release of the urethane due to the adherence of the urethane to the thermoplastic; and wherein said thermoplastic has a flex modulus of between about 110,000 and about 130,000 psi at −40° F.

15. The occupant restraint device as recited in claim 14 wherein said first legs are adhered to the lid and the second legs are adhered to said sidewalls.

16. The occupant restraint device as recited in claim 14 wherein the restraint device includes a base plate, said gas bag deploys in a direction away from said plate, said urethane forms sidewalls when molded to the legs, and each said angle member is provided with a transverse lip adapted to be connected to the base plate member of the restraint device whereby to inhibit vertical movement of the sidewalls.

17. The occupant restraint device as recited in claim 14 wherein a pair of endwalls extend transversely between said sidewalls, each said sidewall and end wall being rigidly securable to a bracket extending from the device.

18. The occupant restraint device as recited in claim 17 wherein a lateral tearing line is formed in each said end wall and longitudinally across the lid between the endwalls.

19. The occupant restraint device as recited in claim 14 wherein one said tearing line extends across the lid and the second legs have an elongated edge disposed adjacent to said one tearing line.

20. The occupant restraint device as recited in claim 14 wherein said thermoplastic has a flex modulus of about 120,000 psi at −40° F.

21. The occupant restraint device as recited in claim 14 wherein the urethane lid completely covers only an upper surface of each said angle member.

22. A method of making a cover for covering an air bag module installation of a vehicle, the steps comprising:
   forming a pair of L-shaped angle brackets of a durable thermoplastic material,
   molding a layer of urethane onto the brackets to form a lid, a pair of sidewalls, and areas of reduced thickness which define tearing lines which allow the lid to rip open when the air bag of the installation is deployed, the urethane being of a type which strongly adheres to the thermoplastic and covering the brackets.

23. The method as recited in claim 22 wherein the forming step includes molding an inturned lip on each bracket.

24. A cover made by the method of claim 22, said thermoplastic material having a flex modulus in the range of about 110,000 psi to 130,000 psi at −40° F.

* * * * *